United States Patent
Fouret et al.

(10) Patent No.: US 7,369,546 B2
(45) Date of Patent: *May 6, 2008

(54) METHOD AND APPARATUS FOR FAST DTMF DETECTION

(75) Inventors: Joachim Fouret, London (GB); Masoud Ahmadi, Harlow (GB); Mohamed El-Hennawey, Belleville (CA); Can Liao, Belleville (CA)

(73) Assignee: Nortel Networks Limited, St. Laurent, QC. (CA)

( * ) Notice: Subject to any disclaimer, the term of this patent is extended or adjusted under 35 U.S.C. 154(b) by 550 days.

This patent is subject to a terminal disclaimer.

(21) Appl. No.: 10/688,642

(22) Filed: Oct. 17, 2003

(65) Prior Publication Data
US 2005/0100121 A1 May 12, 2005

(51) Int. Cl.
*H04L 12/66* (2006.01)
(52) U.S. Cl. ..................................... 370/356
(58) Field of Classification Search ............... None
See application file for complete search history.

(56) References Cited

U.S. PATENT DOCUMENTS

| | | | | |
|---|---|---|---|---|
| 5,353,346 A * | 10/1994 | Cox et al. | ............. | 379/386 |
| 6,075,783 A * | 6/2000 | Voit | ............. | 370/352 |
| 6,259,691 B1 * | 7/2001 | Naudus | ............. | 370/352 |
| 6,757,367 B1 * | 6/2004 | Nicol | ............. | 379/90.01 |
| 7,020,272 B2 * | 3/2006 | Tanrikulu | ............. | 379/386 |
| 2002/0105942 A1 * | 8/2002 | Ahmadi et al. | ............. | 370/352 |

* cited by examiner

*Primary Examiner*—Ramnandan Singh
(74) *Attorney, Agent, or Firm*—Anderson Gorecki & Manaras LLP

(57) ABSTRACT

A fast DTMF detector for filtering a packetized linear voice signal to identify whether the voice signal contains a DTMF tone. The detector includes a plurality of parallel notch filters for knocking down DTMF tones. The energies of the filtered signals output by the notch filters are calculated and criteria based upon the calculated energies are applied to determine if the voice signal contains a DTMF tone. The criteria include an energy differential test, a twist test, a low frequency tolerance test, a high frequency tolerance test, a packetized linear voice signal energy level test, a dial tone filtered signal energy level test, and a 1004 Hz filtered signal energy level test.

19 Claims, 2 Drawing Sheets

METHOD AND APPARATUS FOR FAST DTMF DETECTION

FIELD OF THE INVENTION

This invention relates to signal processing in packet-based networks and, in particular, to DTMF detection.

BACKGROUND OF THE INVENTION

Dual tone multi-frequency (DTMF) signals were originally developed to facilitate the automated dialing of telephone numbers by end-users. They have since found wider application in transmitting other information, such as for example in voice mail systems and automated telephone menu systems. In the public switched telephone network (PSTN), DTMF signals are transmitted in-band with voice signals. A set of standards have been developed to set specifications for how DTMF is to be generated and when a DTMF tone should be recognized. For example the International Telecommunications Union has developed standards ITU-T Q.23 and ITU-T Q.24.

A DTMF signal is a sum of two predetermined frequencies, one selected from a set of four low frequency tones, and one selected from a set of four high frequency tones. Each pair of tones represents one of sixteen keys. The standard telephone keypad only uses the first twelve keys, and not the four alphanumeric keys (A to D), which are reserved for future use. The frequencies and their corresponding keys are outlined below in Table 1.

TABLE 1

| f(Hz) | 1209 | 1336 | 1477 | 1633 |
|---|---|---|---|---|
| 697 | 1 | 2 | 3 | A |
| 770 | 4 | 5 | 6 | B |
| 852 | 7 | 8 | 9 | C |
| 941 | * | 0 | # | D |

Digital packet-based networks, like the Internet, are increasingly being used for transmission of telephone signals. The use of packet-based networks for telephony presents a problem for DTMF signaling. The compression techniques used for preserving bandwidth in packet-based networks are acceptable for speech, since the associated degradation is tolerable; however, these compression techniques degrade DTMF signals to an extent that they no longer satisfy the standards and will fail to be recognized at the receiver.

In order to address this problem, packet-based networks mat attempt to detect DTMF tones in a voice signal so as to strip them out before transmitting the voice signal. The DTMF tones represent alphanumeric information, and can easily and more efficiently be sent as a separate binary signal, or be otherwise encoded in the packetized linear voice signal. Accordingly, a packet-based network may employ a DTMF detector.

Another difficulty encountered with packet-based signals is that of end-to-end delay. Delay results from the processing associated with packetization and compression, and from the inherent delay in transmission through routers. Delay in packet-based telephony is particularly noticeable to the users.

Detecting a DTMF tone takes a certain amount of time, and the lag associated with this detection time can result in a portion of the DTMF tone leaking in-band prior to the detection occurring and prior to triggering a muting of the DTMF tone. At the receiving end, this leaked portion will be recombined with a regenerated DTMF signal and can result in spectral line splitting, which in turn can result in a failure to detect a valid DTMF digit. In some cases, it can lead to the false detection of double digits.

To avoid the spectral line splitting problem, a transmission delay must be incorporated so as to hold the voice packet while the DTMF detector attempts to detect a DTMF signal. The voice packet is only sent once the DTMF detector has finished analyzing whether or not the packet contains a DTMF signal. Therefore, DTMF detectors having a significant delay will further aggravate the delay problems of packet-based telephony.

Existing DTMF detectors typically require at least 10 milliseconds to analyze a packet for DTMF signals.

Accordingly, there remains a need for a DTMF detector that is capable of detecting DTMF signals quickly.

SUMMARY OF THE INVENTION

The present invention provides a DTMF detector that filters an incoming packetized linear voice signal through a set of parallel notch filters to knock down the potential DTMF tones. Each notch filter includes two notches corresponding to a selected pair of DTMF frequencies making up a DTMF tone. The energy levels of the resulting filtered signals are analyzed and this information is used to assess whether the incoming signal contains a DTMF tone.

In one aspect, the present invention provides a method for detecting DTMF signals in a packetized linear voice signal. The method includes the steps of filtering the packetized linear voice signal through a plurality of notch filters, each of the notch filters having a pair of notches at DTMF frequencies and each of the notch filters producing a filtered signal, calculating an energy level for each of the filtered signals, evaluating one or more criteria using the calculated energy levels, and, if the criteria are met, producing a DTMF indicator.

In a further aspect, the present invention provides a DTMF detector for detecting DTMF signals in a packetized linear voice signal. The DTMF detector includes a plurality of notch filters each having a pair of notches at DTMF frequencies and each of the notch filters receiving the packetized linear voice signal and producing a filtered signal, a calculating module for calculating an energy level for each of the filtered signals, and an evaluating module for evaluating one or more criteria using the energy levels and, if the criteria are met, producing a DTMF indicator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following detailed description of specific embodiments of the present invention does not limit the implementation of the invention to any particular programming language or signal processing architecture. In one embodiment, the present invention is implemented, at least partly, using a digital signal processor. It will be understood that the present invention may be implemented using other architectures, including a microcontroller, a microprocessor, programmable logic arrays, discrete components, or combinations thereof. Any limitations presented herein as a result of a particular type of signal processing architecture or programming language are not intended as limitations of the present invention.

Figure 1:
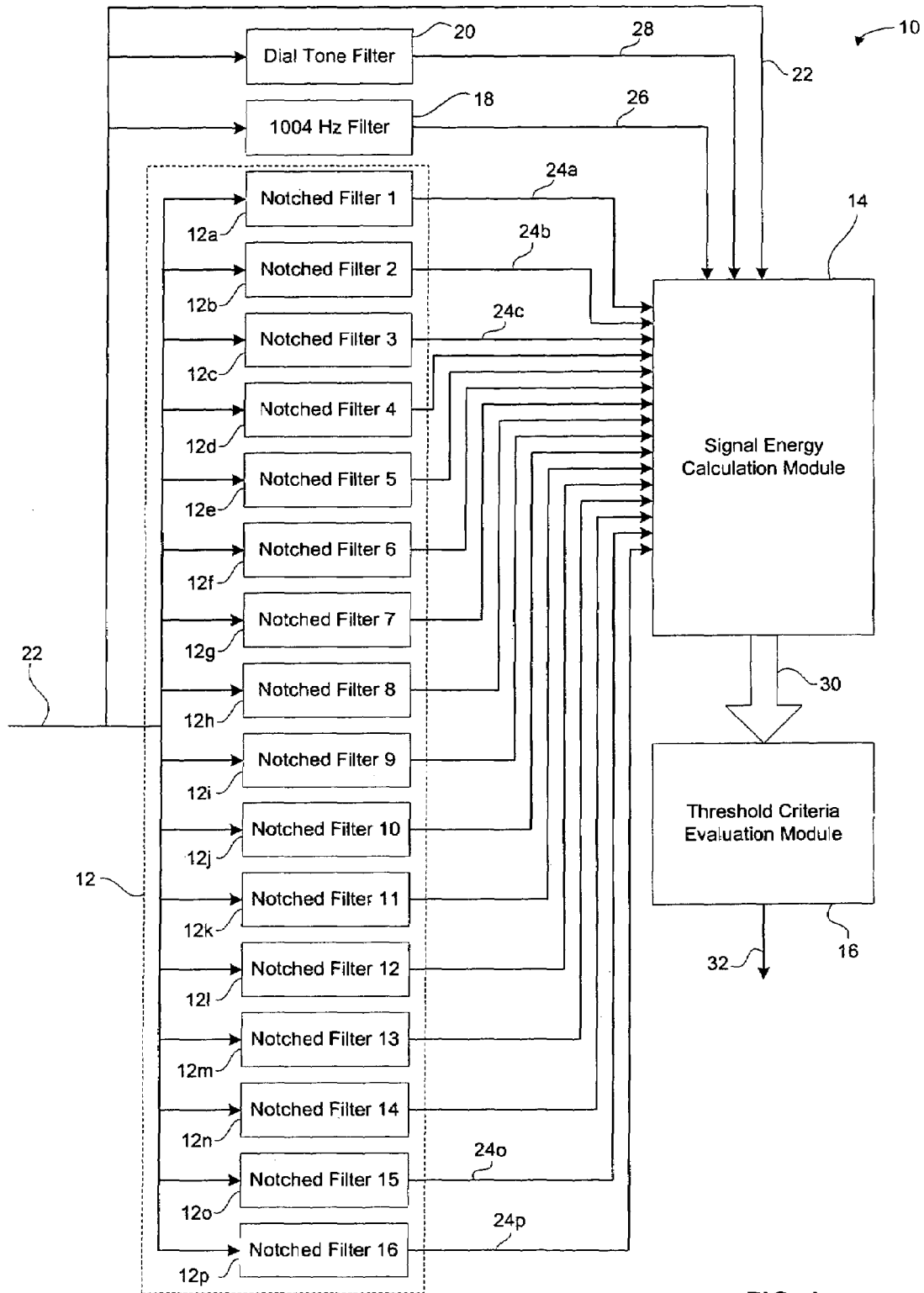
FIG. 1 shows a block diagram of an embodiment of a DTMF detector according to the present invention.

Reference is first made to FIG. 1, which shows a block diagram of an embodiment of a DTMF detector 10 according to the present invention. The detector 10 includes a plurality, e.g. a set or bank, of notch filters 12. Each notch filter 12 has a transfer characteristic that features two notches corresponding to two of the DTMF frequencies. In other words, each notch filter 12 is designed to knock down the two frequencies that make up a particular DTMF tone. In one embodiment, the notch filters 12 comprise sixteen individual notch filters 12a, 12b, . . . , 12p, corresponding to the sixteen DTMF tones. In such an embodiment, the notch filters 12 will each have a pair of notches roughly centered as follows:

TABLE 2

| Filter No. | DTMF Key | Low Freq. | High Freq. |
|---|---|---|---|
| 1 | 1 | 697 Hz | 1209 Hz |
| 2 | 2 | 697 Hz | 1336 Hz |
| 3 | 3 | 697 Hz | 1477 Hz |
| 4 | A | 697 Hz | 1633 Hz |
| 5 | 4 | 770 Hz | 1209 Hz |
| 6 | 5 | 770 Hz | 1336 Hz |
| 7 | 6 | 770 Hz | 1477 Hz |
| 8 | B | 770 Hz | 1633 Hz |
| 9 | 7 | 852 Hz | 1209 Hz |
| 10 | 8 | 852 Hz | 1336 Hz |
| 11 | 9 | 852 Hz | 1477 Hz |
| 12 | C | 852 Hz | 1633 Hz |
| 13 | * | 941 Hz | 1209 Hz |
| 14 | 0 | 941 Hz | 1336 Hz |
| 15 | # | 941 Hz | 1477 Hz |
| 16 | D | 941 Hz | 1633 Hz |

Each of the notch filters 12 receives a packetized linear voice signal 22 as an input. In one embodiment, the packetized linear voice signal 22 is arranged in frames of 5 millisecond duration, each frame containing forty samples of an input signal sampled at 8 kHz. The notch filters 12 operate upon the packetized linear voice signal 22 in parallel and output a corresponding set of notch filtered signals 24a, 24b, . . . , 24p.

The detector 10 further includes a signal energy calculation module 14 coupled to the notch filters 12, arranged in parallel as shown in FIG. 1, for calculating the energies of the notch filtered signals 24. The signal energy calculation module 14 generates signal energy information 30.

The signal energy information 30 is provided to a threshold criteria evaluation module 16. The threshold criteria evaluation module 16 applies several criteria to the signal energy information 30 to determine whether or not the packetized linear voice signal 22 contains a DTMF tone. Based upon this evaluation, the threshold criteria evaluation module 16 generates a DTMF indicator 32 that signals if a DTMF tone is present.

In one embodiment, the detector 10 further includes additional notch filters for applying additional criteria at the evaluation stage. For example, the detector 10 includes a 1004 Hz filter 18 to knock down a tone at 1004 Hz that can occasionally cause false DTMF tone detection. In addition, the detector 10 includes a dial tone filter 20 for knocking down the dial tone, which results from the combination of the dial tone frequencies 350 Hz and 440 Hz. In one embodiment, the dial tone filter 20 is a notch filter at 400 Hz.

The 1004 Hz filter 18 produces a 1004 Hz filtered signal 26, and the dial tone filter 20 produces a dial tone filtered signal 28, both of which are input to the signal energy calculation module 14. The packetized linear voice signal 22 may also be input to the signal energy calculation module 14.

The coefficients for establishing the notch filters 12 may be obtained offline through an adaptive algorithm. For example, the notch filters 12 may be designed as $4^{th}$ order FIR filters using Burg's method. Once the appropriate coefficients are obtained through an offline adaptive algorithm, they are used to establish the notch filters 12.

Figure 2:
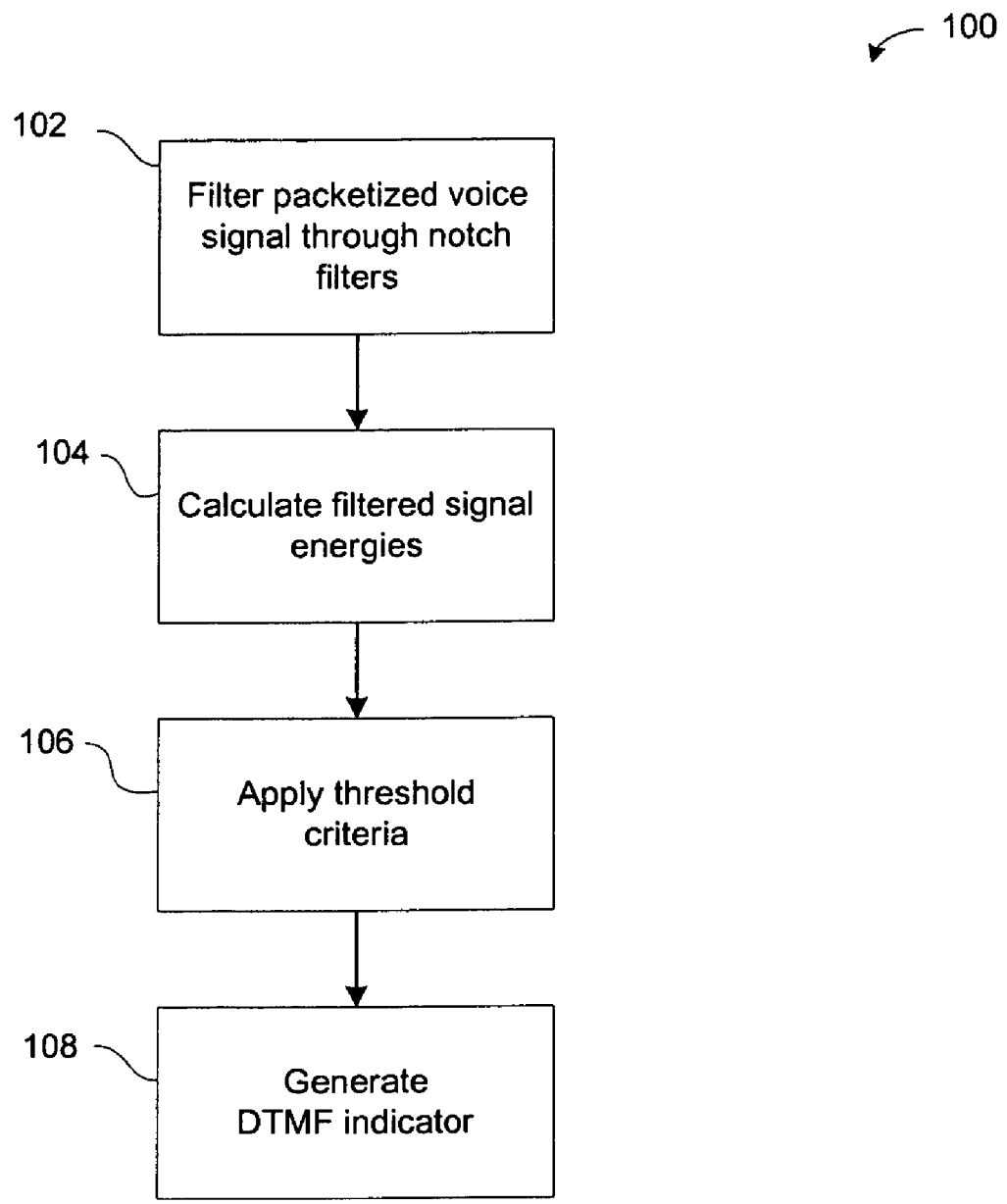
FIG. 2 shows, in flowchart form, a method of detecting a DTMF signal, according to the present invention.

Reference is now made to FIG. 2, which shows, in flowchart form, a method 100 of detecting DTMF signals in the packetized linear voice signal 22 (FIG. 1).

The method 100 begins in step 102 where the packetized linear voice signal 22 is filtered through the notch filters 12 (FIG. 1). The resulting filtered signals 24 (FIG. 1) are input to the signal energy calculation module 14 (FIG. 1). In step 104, the signal energy calculation module 14 calculates the signal energies of the filtered signals 24. The signal energy calculation module 14 may also calculate the signal energies of the 1004 Hz filtered signal 26 (FIG. 1), the dial tone filtered signal 28 (FIG. 1), and the input packetized linear voice signal 22 (FIG. 1).

In one embodiment, the notch filtered signal 24 output by the notch filters 12 are obtained through the difference equation:

$$y_x(k) = a_{x0}r(k) + a_{x1}r(k-1) + a_{x2}r(k-2) + a_{x3}r(k-3) + a_{x4}r(k-4)$$

where r(k) is the packetized linear voice signal 22 sample at instant k, and the coefficients $a_{xi}$ of the notch filters 12 are obtained offline by Burg's algorithm. The table below details the calculated coefficients $a_{xi}$ for one embodiment:

TABLE 3

| | Coefficient | | | | |
|---|---|---|---|---|---|
| Filter x | $a_{x0}$ | $a_{x1}$ | $a_{x2}$ | $a_{x3}$ | $a_{x4}$ |
| 1 | 0.100000 | −0.287197 | 0.398812 | −0.287197 | 0.099999 |
| 2 | 0.100000 | −0.270422 | 0.370163 | −0.270422 | 0.099999 |
| 3 | 0.100000 | −0.250646 | 0.336387 | −0.250646 | 0.099999 |
| 4 | 0.100000 | −0.227636 | 0.297089 | −0.227636 | 0.099999 |
| 5 | 0.100000 | −0.280953 | 0.391545 | −0.280953 | 0.099999 |
| 6 | 0.100000 | −0.264179 | 0.363944 | −0.264179 | 0.099999 |
| 7 | 0.100000 | −0.244403 | 0.331403 | −0.244403 | 0.099999 |
| 8 | 0.100000 | −0.221393 | 0.293541 | −0.221393 | 0.099999 |
| 9 | 0.100000 | −0.273296 | 0.382631 | −0.273296 | 0.099999 |
| 10 | 0.100000 | −0.256522 | 0.356315 | −0.256522 | 0.099999 |
| 11 | 0.100000 | −0.236746 | 0.325289 | −0.236746 | 0.099999 |

TABLE 3-continued

| | Coefficient | | | | |
|---|---|---|---|---|---|
| Filter x | $a_{x0}$ | $a_{x1}$ | $a_{x2}$ | $a_{x3}$ | $a_{x4}$ |
| 12 | 0.100000 | −0.213736 | 0.289189 | −0.213736 | 0.099999 |
| 13 | 0.100000 | −0.264249 | 0.372100 | −0.264249 | 0.099999 |
| 14 | 0.100000 | −0.247475 | 0.347302 | −0.247475 | 0.099999 |
| 15 | 0.100000 | −0.227699 | 0.318065 | −0.227699 | 0.099999 |
| 16 | 0.100000 | −0.204689 | 0.284047 | −0.204689 | 0.099999 |

The dial tone filtered signal 28 is obtained using the difference equation:

$$Z(k)=b_0 r(k)+b_1 r(k-1)+b_2 r(k-2)$$

where $b_0$, $b_1$, $b_2$ are the dial tone filter coefficients, which in one embodiment are calculated to be:

$b_0=1$;
$b_1=-1.99997$; and
$b_2=1$.

Similarly, the 1004 Hz filtered signal 26 is obtained from the difference equation:

$$g(k)=d_0 r(k)+d_1 r(k-1)+d_2 r(k-2)$$

where $d_0$, $d_1$, $d_2$ are the 1004 Hz filter coefficients, which in one embodiment are calculated to be:

$d_0=1$;
$d_0=-1.9998$; and
$d_2=1$.

The calculation of signal energy by the signal energy calculation module 14 is performed on a frame-by-frame basis for each signal normalized to the frame energy of the packetized linear voice signal 22. If a frame for the input packetized linear voice signal 22 includes 40 samples r(n), where n=1 to 40, then the output notch filtered signal 24 is y(n). In one embodiment the signal energy of notch filtered signal 24x(x=a,b,c, . . . , p) is determined as:

$$NE=y^2(\mu+1)+y^2(\mu+2)+\ldots+y^2(N)/[r^2(\mu+1)+r^2(\mu+2)+\ldots+r^2(N)]$$

where NE is the energy of notch filtered signal 24x, μ is the order of the filter, which in one embodiment is 4, and N is the number of samples in the frame, which in one embodiment is 40. Note that in the sixth criterion, described below, the absolute energy is used since the criterion relates to the packetized linear voice signal 22 itself. The first μ samples of the filter output are not used to avoid the transient filter response.

The signal energy information 30 (FIG. 1) generated by the signal energy calculation module 14 is used by the threshold criteria evaluation module 16 (FIG. 1) to determine if a DTMF tone is present in the packetized linear voice signal 22 in step 106. The threshold criteria evaluation module 16 applies several criteria to assess whether the energies calculated for the signals from the various filters 12, 18, and 20 demonstrate the presence of a DTMF tone. In one embodiment, if all the criteria are met, then a DTMF tone is deemed to be present.

In one embodiment, the criteria include eight thresholds that must be met to signify a DTMF tone.

The first criterion is a first energy differential test. The first energy differential test evaluates whether the notch filtered signal 24 having the minimum energy level has an energy level a predetermined amount lower than the energy level of the notch filtered signal 24 having the maximum energy level. If so, then the threshold is met and indicates a possible DTMF tone.

The test is based upon the understanding that a tone at the notch frequencies for a particular notch filter 12 would result in a notch filtered signal 24 from that notch filter 12 having an energy level significantly lower than the energy levels of the notch filtered signals 24 from the other notch filters 12. The first energy differential test may be expressed as:

$$K1^*\max(NE(x))-\min(NE(x)) \geq C1$$

where max(NE(x)) is the maximum energy level among the notch filtered signals 24 for frame x, min(NE(x)) is the minimum energy level among the notch filtered signals 24 for frame x, K1 is an empirical parameter, and C1 is the first criterion's threshold. In one embodiment, K1 is determined to be $10^{-30/20}$, and C1 is −0.079713.

The second criterion is a second energy differential test. The second energy differential test assesses whether the signal energy is strongly located on one DTMF tone by assessing whether the notch filtered signal 24 having the minimum energy level has an energy level a predetermined amount lower than the notch filtered signal 24 having second lowest energy level. If the signal with the minimum level has an energy level a significant amount lower than the second-to-minimum signal, then it is indicative of a potential DTMF tone.

The second test may be expressed as:

$$K2^*\text{secmin}(NE(x))-\min(NE(x)) \geq C2$$

where secmin(NE(x)) is the second-to-minimum energy level among the notch filtered signals 24 for frame x, K2 is an empirical parameter, and C2 is the second criterion's threshold. In one embodiment, K2 is determined to be $10^{-4/20}$ and C2 is −0.039857.

The third criterion is a twist test, which is an evaluation of the twist of the two frequency components that make up the DTMF tone. For the notch filtered signal 24 having the minimum signal energy level, a comparison is made between the energy level contributions attributable to the low frequency tone and the high frequency tone. This is accomplished by analyzing two different notch filtered signals 24, each having a notch at one of either the low frequency tone or the high frequency tone of the minimum signal. For example, if the minimum signal energy level is sensed at a filter having notches at low frequency 1 and high frequency 2, then the twist test compares the signal energies produced by a filter having notches at low frequency 1 and high frequency 4 and a filter having notches at low frequency 3 and high frequency 2. The test may determine if the relative contributions of the two tones to the minimum signal energy are within an expected range.

In one embodiment, the twist test may be expressed as:

$$(NE(n+\text{offsetLow1}(n))+\epsilon)-K\text{twist}(n)^*(NE(n+\text{offsetHigh1}(n))+\epsilon) \geq C3$$

where NE( ) is the signal energy, n is the filter number, offsetLow1(n) is an offset for filter n to isolate the low frequency component, offsetHigh1(n) is an offset for filter n to isolate the high frequency component, and Ktwist and $\epsilon$ are empirically determined constants. In one embodiment $\epsilon$ is $10^{-15}$. The table below provides the constants for Ktwist (n) according to one embodiment of the present invention. C3 is also an empirically determined constant, which in one embodiment is −0.01.

TABLE 4

| Filter No. | Ktwist |
|---|---|
| 1 | 0.693208 |
| 2 | 0.949722 |
| 3 | 0.692794 |
| 4 | 0.949279 |
| 5 | 0.479940 |
| 6 | 0.657535 |
| 7 | 0.479740 |
| 8 | 0.657311 |
| 9 | 0.689847 |
| 10 | 0.945359 |
| 11 | 0.689571 |
| 12 | 0.944877 |
| 13 | 0.478261 |
| 14 | 0.655051 |
| 15 | 0.477858 |
| 16 | 0.654666 |

The offsets, offsetLow1(n) and offsetHigh1(n) are vectors, which in one embodiment have the following values:
offsetLow1(n)=[2 2 −2 −2 2 2 −2 −2 2 2 −2 −2 2 2 −2 −2];
offsetHigh1(n)=[8 8 8 8 8 8 8 8 −8 −8 −8 −8 −8 −8 −8 −8];

Applying the above offset vectors to the twist test equation results in the following expressions of the twist test, based upon the filter number:

TABLE 5

| Filter | Criteria |
|---|---|
| 1 | (NE(3) + ε) − Ktwist(1) * (NE(9) + ε) ≧ C3 |
| 2 | (NE(4) + ε) − Ktwist(2) * (NE(10) + ε) ≧ C3 |
| 3 | (NE(1) + ε) − Ktwist(3) * (NE(11) + ε) ≧ C3 |
| 4 | (NE(2) + ε) − Ktwist(4) * (NE(12) + ε) ≧ C3 |
| 5 | (NE(7) + ε) − Ktwist(5) * (NE(13) + ε) ≧ C3 |
| 6 | (NE(8) + ε) − Ktwist(6) * (NE(14) + ε) ≧ C3 |
| 7 | (NE(5) + ε) − Ktwist(7) * (NE(15) + ε) ≧ C3 |
| 8 | (NE(6) + ε) − Ktwist(8) * (NE(16) + ε) ≧ C3 |
| 9 | (NE(11) + ε) − Ktwist(9) * (NE(1) + ε) ≧ C3 |
| 10 | (NE(12) + ε) − Ktwist(10) * (NE(2) + ε) ≧ C3 |
| 11 | (NE(9) + ε) − Ktwist(11) * (NE(3) + ε) ≧ C3 |
| 12 | (NE(10) + ε) − Ktwist(12) * (NE(4) + ε) ≧ C3 |
| 13 | (NE(15) + ε) − Ktwist(13) * (NE(5) + ε) ≧ C3 |
| 14 | (NE(16) + ε) − Ktwist(14) * (NE(6) + ε) ≧ C3 |
| 15 | (NE(13) + ε) − Ktwist(15) * (NE(7) + ε) ≧ C3 |
| 16 | (NE(14) + ε) − Ktwist(16) * (NE(8) + ε) ≧ C3 |

The fourth criterion is a low frequency tolerance test. The low frequency tolerance test assesses whether the low frequency component of a suspected DTMF tone falls within the accepted tolerances. According to ITU recommendations, the low frequency signal must be within 1.5% of the target low frequency to qualify as a detected signal. One method of assessing the extent to which the low frequency signal meets this criteria is through assessing the extent to which that component of the signal is removed by the notch filter. A method of making that assessment is to compare the relative signal energies of other notch filters that include a notch at the low frequency.

In one embodiment, the low frequency tolerance test may be expressed as:

$$Klf(n)*NE(n+\text{offsetLow1}(n))-NE(n+\text{offsetLow2}(n)) \geq C4$$

where NE( ) is the signal energy, n is the filter number of the filter having the minimum signal energy, offsetLow1(n) is an offset for filter n to select a filter having a notch at the low frequency component, offsetLow2 (n) is an offset for filter n to select another filter having a notch at the low frequency component, and Klf and C4 are empirically determined constants. In one embodiment, C4 is −0.057 and Klf (n) has the values shown in the table below:

TABLE 6

| Filter No. | Klf |
|---|---|
| 1 | 0.344174 |
| 2 | 0.344174 |
| 3 | 0.344174 |
| 4 | 0.344174 |
| 5 | 0.352217 |
| 6 | 0.352217 |
| 7 | 0.352217 |
| 8 | 0.352217 |
| 9 | 0.509995 |
| 10 | 0.509995 |
| 11 | 0.509995 |
| 12 | 0.509995 |
| 13 | 0.502859 |
| 14 | 0.502859 |
| 15 | 0.502859 |
| 16 | 0.502859 |

The offsets, offsetLow1(n) and offsetLow2(n) are vectors, which in one embodiment have the following values:
offsetLow1(n)=[2 2 −2 −2 2 2 −2 −2 2 2 −2 −2 2 2 −2 −2];
offsetLow2(n)=[1 1 −1 −1 1 1 −1 −1 1 1 −1 −1 1 1 −1 −1];

Applying the above offset vectors to the low frequency tolerance equation results in the following expressions of the low frequency tolerance test, based upon the filter number:

TABLE 7

| Filter | Criteria |
|---|---|
| 1 | Klf(1) * NE(3) − NE(2) ≧ C4 |
| 2 | Klf(2) * NE(4) − NE(3) ≧ C4 |
| 3 | Klf(3) * NE(1) − NE(2) ≧ C4 |
| 4 | Klf(4) * NE(2) − NE(3) ≧ C4 |
| 5 | Klf(5) * NE(7) − NE(6) ≧ C4 |
| 6 | Klf(6) * NE(8) − NE(7) ≧ C4 |
| 7 | Klf(7) * NE(5) − NE(6) ≧ C4 |
| 8 | Klf(8) * NE(6) − NE(7) ≧ C4 |
| 9 | Klf(9) * NE(11) − NE(10) ≧ C4 |
| 10 | Klf(10) * NE(12) − NE(11) ≧ C4 |
| 11 | Klf(11) * NE(9) − NE(10) ≧ C4 |
| 12 | Klf(12) * NE(10) − NE(11) ≧ C4 |
| 13 | Klf(13) * NE(15) − NE(14) ≧ C4 |
| 14 | Klf(14) * NE(16) − NE(15) ≧ C4 |
| 15 | Klf(15) * NE(13) − NE(14) ≧ C4 |
| 16 | Klf(16) * NE(14) − NE(15) ≧ C4 |

The fifth criterion is a high frequency tolerance test. The high frequency tolerance test assesses whether the high frequency component of a suspected DTMF tone falls within the accepted tolerances. According to ITU recommendations, the high frequency signal must be within 1.5% of the target high frequency to qualify as a detected signal. One method of assessing the extent to which the high frequency signal meets this criteria is through assessing the extent to which that component of the signal is removed by the notch filter. A method of making that assessment is to compare the relative signal energies of other notch filters that include a notch at the high frequency.

In one embodiment, the high frequency tolerance test may be expressed as:

$$Khf(n)*NE(n+\text{offsetHigh1}(n))-NE(n+\text{offsetHigh2}(n)) \geq C5$$

where NE( ) is the signal energy, n is the filter number of the filter having a minimum signal energy, offsetHigh1(n) is an offset for filter n to select a filter having a notch at the high frequency component, offsetHigh2(n) is an offset for filter n to select another filter having a notch at the high frequency component, and Khf and C5 are empirically determined constants. In one embodiment, C5 is −0.025 and Khf(n) has the values shown in the table below:

TABLE 8

| Filter No. | Khf |
|---|---|
| 1 | 0.424951 |
| 2 | 0.428692 |
| 3 | 0.603381 |
| 4 | 0.596203 |
| 5 | 0.424951 |
| 6 | 0.428692 |
| 7 | 0.603381 |
| 8 | 0.596203 |
| 9 | 0.424951 |
| 10 | 0.428692 |
| 11 | 0.603381 |
| 12 | 0.596203 |
| 13 | 0.424951 |
| 14 | 0.428692 |
| 15 | 0.603381 |
| 16 | 0.596203 |

The offsets, offsetHigh1(n) and offsetHigh2(n) are vectors, which in one embodiment have the following values:

offsetHigh1(n)=[8 8 8 8 8 8 8 8 −8 −8 −8 −8 −8 −8 −8 −8];

offsetHigh2(n)=[4 4 4 4 4 4 4 4 −4 −4 −4 −4 −4 −4 −4 −4];

Applying the above offset vectors to the high frequency tolerance equation results in the following expressions of the high frequency tolerance test, based upon the filter number:

TABLE 9

| Filter | Criteria |
|---|---|
| 1 | Khf(1) * NE(9) − NE(5) ≧ C5 |
| 2 | Khf(2) * NE(10) − NE(6) ≧ C5 |
| 3 | Khf(3) * NE(11) − NE(7) ≧ C5 |
| 4 | Khf(4) * NE(12) − NE(8) ≧ C5 |
| 5 | Khf(5) * NE(13) − NE(9) ≧ C5 |
| 6 | Khf(6) * NE(14) − NE(10) ≧ C5 |
| 7 | Khf(7) * NE(15) − NE(11) ≧ C5 |
| 8 | Khf(8) * NE(16) − NE(12) ≧ C5 |
| 9 | Khf(9) * NE(1) − NE(5) ≧ C5 |
| 10 | Khf(10) * NE(2) − NE(6) ≧ C5 |
| 11 | Khf(11) * NE(3) − NE(7) ≧ C5 |
| 12 | Khf(12) * NE(4) − NE(8) ≧ C5 |
| 13 | Khf(13) * NE(5) − NE(9) ≧ C5 |
| 14 | Khf(14) * NE(6) − NE(10) ≧ C5 |
| 15 | Khf(15) * NE(7) − NE(11) ≧ C5 |
| 16 | Khf(16) * NE(8) − NE(12) ≧ C5 |

The sixth criterion is an input signal energy test. The input signal energy test determines whether the signal energy of the input packetized linear voice signal 22 is greater than an empirically determined threshold value, C6. In one embodiment, the threshold value C6 is 0.001. The energy calculation in this sixth criterion an absolute frame energy calculation for the packetized linear voice signal 22, instead of the normalized calculations used in the other criteria.

The seventh criterion is a 1004 Hz test. The 1004 test is intended to reject DTMF tone indications that result from the presence of a 1004 Hz signal, which has been found to trigger false DTMF detections. The signal energy of the 1004 Hz filtered signal 26 is compared to a threshold value, C7. If the signal energy of the 1004 Hz filtered signal 26 is greater than the empirically determined threshold value C7, then this criterion is met. In one embodiment, the threshold value is 0.01.

The eighth criterion is a dial tone test. The dial tone test is intended to reject DTMF tone indications that result from the presence of dial tone frequencies, which have been found to trigger false DTMF detections. The signal energy of the dial tone filtered signal 28 is compared to a threshold value, C8. If the signal energy of the dial tone filtered signal 28 is greater than the empirically determined threshold value C8, then this criterion is met. In one embodiment, the threshold value is 1.

Referring still to FIG. 2, if the threshold criteria are met in step 106, then the threshold criteria evaluation module 108 generates a DTMF indicator 32. The DTMF indicator 32 is a signal indicating that a DTMF tone is present in the packetized linear voice signal 22. The DTMF indicator 32 may further include information regarding which DTMF tone has been detected in the packetized linear voice signal 22.

Although embodiments of the present invention are described above with reference to eight specific criteria that must be met to signify a DTMF tone, it will be appreciated that fewer or more criteria may be applied, and that a DTMF tone could be indicated if a subset of the criteria are met. Variations in the criteria, the thresholds, and in the manner of adjudging the presence of a DTMF tone from the criteria results will be understood by those of ordinary skill in the art when considered in light of the above description.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of detecting DTMF signals in a packetized linear voice signal, comprising the steps of:
    (a) filtering the packetized linear voice signal through a plurality of notch filters, each of said notch fitters having a pair of notches at a pair of DTMF frequencies corresponding to a respective DTMF tone and each of said notch filters producing a filtered signal;
    (b) calculating an energy level for each of said filtered signals;
    (c) evaluating one or more criteria using said calculated energy levels; and
    (d) if said criteria are met, producing an indicator that a DTMF tone is present.

2. The method claimed in claim 1, wherein said notch filters include sixteen parallel notch filters, each having a pair of notches centered at a pair of DTMF frequencies corresponding to a respective DTMF tone.

3. The method claimed in claim 1, wherein the packetized linear voice signal and said filtered signals include frames, and wherein said step of calculating includes calculating said energy level over a selected frame of each of said filtered signals.

4. The method claimed in claim 3, wherein said selected frame includes samples and said step of calculating includes calculating a sum of squares of said samples.

5. The method claimed in claim 1, wherein said energy levels include a minimum energy level and a maximum energy level and wherein said step of evaluating includes determining whether said maximum energy level exceeds said minimum energy level by at least a predetermined threshold.

6. The method claimed in claim 1, wherein said energy levels include a minimum energy level and a second-to-minimum energy level and wherein said step of evaluating includes determining whether said second-to-minimum energy level exceeds said minimum energy level by at least a predetermined threshold.

7. The method claimed in claim 1, wherein said energy levels include a minimum energy level corresponding to said filtered signal produced by a first of said notch filters having notches at a first and second DTMF frequency, and wherein said step of evaluating includes determining whether said energy level for a second of said notch filters exceeds said energy level for a third of said notch filters by a predetermined threshold, wherein said second filter includes a notch at said first DTMF frequency and said third filter includes a notch at said second DTMF frequency.

8. The method claimed in claim 1, wherein said energy levels include a minimum energy level corresponding to said filtered signal produced by a first of said notch filters having a notch at a first lower DTMF frequency, and wherein said step of evaluating includes determining whether said energy level for a second of said notch filters exceeds said energy level for a third of said notch filters by a predetermined threshold, wherein said second and third filters both include a notch at said first lower DTMF frequency.

9. The method claimed in claim 1, wherein said energy levels include a minimum energy level corresponding to said filtered signal produced by a first of said notch filters having a notch at a first upper DTMF frequency, and wherein said step of evaluating includes determining whether said energy level for a second of said notch filters exceeds said energy level for a third of said notch filters by a predetermined threshold, wherein said second and third filters both include a notch at said first upper DTMF frequency.

10. The method claimed in claim 1, wherein said step of filtering further includes filtering the packetized linear voice signal through a 1004 Hz notch filter having a notch at approximately 1004 Hz and producing a 1004 Hz filtered signal, wherein said step of calculating includes calculating a 1004 Hz energy level for said 1004 Hz filtered signal, and wherein said step of evaluating includes determining whether said 1004 Hz energy level exceeds a predetermined threshold.

11. The method claimed in claim 1, wherein said step of filtering further includes filtering the packetized linear voice signal through a dial tone notch filter having a notch at approximately 400 Hz and producing a dial tone filtered signal, wherein said step of calculating includes calculating a dial tone energy level for said dial tone filtered signal, and wherein said step of evaluating includes determining whether said dial tome energy level exceeds a predetermined threshold.

12. A DTMF detector for detecting DTMF signals in a packetized linear voice signal, comprising:
   (a) a plurality of notch filters each having a pair of notches at a pair of DTMF frequencies corresponding to a respective DTMF tone and each of said notch filters receiving the packetized linear voice signal and producing a filtered signal;
   (b) a calculating module for calculating an energy level for each of said filtered signals; and
   (c) an evaluating module for evaluating one or more criteria using said energy levels and, if said criteria are met, producing an indicator that a DTMF tone is present.

13. The detector claimed in claim 12, wherein said notch filters include sixteen parallel notch filters, each having a pair of notches centered at a pair of DTMF frequencies corresponding to a respective DTMF tone.

14. The detector claimed in claim 13, wherein said sixteen parallel notch filters include 4.sup.th order FIR filters.

15. The detector claimed in claim 13, wherein said set of parallel notch filters further include a 1004 Hz notch filter and a dial tone notch filter.

16. The detector claimed in claim 12, wherein the packetized linear voice signal and said filtered signals include frames containing samples, and wherein said calculating module calculates said energy level includes a sum of squares of said samples over a selected frame.

17. The detector claimed in claim 12, wherein said criteria include an energy differential test comparing said energy levels, a twist test comparing said energy levels to determine the relative contributions of a high and low frequency to a suspected DTMF tone, a low frequency tolerance test, and a high frequency tolerance test.

18. The detector claimed in claim 17, wherein said criteria further include a packetized liner voice signal energy level test, a dial tone filtered signal energy level test, and a 1004 Hz filtered signal energy level test.

19. A method of detecting DTMF signals in a packetized linear voice signal, comprising the steps of:
   (a) filtering the packetized linear voice signal through a plurality of notch filters, each of said notch filters having a transfer characteristic that features two notches corresponding to a pair of DTMF frequencies generated by a particular key in a telephone keypad, and each of said notch filters producing a filtered signal;
   (b) calculating an energy level for each of said filtered signals;
   (c) evaluating one or more criteria using said calculated energy levels; and
   (d) if said criteria are met, producing an indicator that a DTMF tone is present.

* * * * *

UNITED STATES PATENT AND TRADEMARK OFFICE
CERTIFICATE OF CORRECTION

PATENT NO. : 7,369,546 B2  
APPLICATION NO. : 10/688642  
DATED : May 6, 2008  
INVENTOR(S) : Joachim Fouret et al.

Page 1 of 1

It is certified that error appears in the above-identified patent and that said Letters Patent is hereby corrected as shown below:

Claim 1 Column 10, line 44 fitters should be filters.  
Claim 11 Column 11, line 55 tome should be tone.  
Claim 18 Column 12, line 36 liner should linear.

Signed and Sealed this

Fourth Day of November, 2008

JON W. DUDAS  
*Director of the United States Patent and Trademark Office*